United States Patent
Sarikhani et al.

(10) Patent No.: US 11,283,313 B2
(45) Date of Patent: Mar. 22, 2022

(54) ROTOR ASSEMBLY FOR PERMANENT MAGNET ELECTRIC MOTOR WITH PLURALITY OF SHAFT STRUCTURES

(71) Applicant: Garrett Transportation I Inc., Torrance, CA (US)

(72) Inventors: Ali Sarikhani, Irvine, CA (US); Jeffrey Lotterman, Los Angeles, CA (US); Sushank Singampalli, Lakewood, CA (US)

(73) Assignee: GARRETT TRANSPORTATION I INC, Torrance, CA (US)

( * ) Notice: Subject to any disclaimer, the term of this patent is extended or adjusted under 35 U.S.C. 154(b) by 287 days.

(21) Appl. No.: 16/536,012

(22) Filed: Aug. 8, 2019

(65) Prior Publication Data

US 2021/0044164 A1 Feb. 11, 2021

(51) Int. Cl.
| | |
|---|---|
| *H02K 1/27* | (2006.01) |
| *H02K 1/17* | (2006.01) |
| *H02K 21/02* | (2006.01) |
| *H02K 15/02* | (2006.01) |
| *H02K 15/14* | (2006.01) |
| *H02K 5/02* | (2006.01) |

(52) U.S. Cl.
CPC ............... *H02K 1/27* (2013.01); *H02K 1/17* (2013.01); *H02K 5/02* (2013.01); *H02K 15/02* (2013.01); *H02K 15/14* (2013.01); *H02K 21/02* (2013.01)

(58) Field of Classification Search
CPC ........... H02K 1/28; H02K 15/14; H02K 21/22
USPC ...... 310/46, 156.09, 156.11, 156.08, 156.14, 310/216.116, 216.121, 216.122, 216.124
See application file for complete search history.

(56) References Cited

U.S. PATENT DOCUMENTS

| | | | | |
|---|---|---|---|---|
| 4,876,492 A | * | 10/1989 | Lester | ........................ F04D 3/02 |
| | | | | 318/400.08 |
| 2010/0164422 A1 | * | 7/2010 | Shu | ....................... H02K 21/029 |
| | | | | 318/540 |
| 2016/0049845 A1 | | 2/2016 | Gove et al. | |

FOREIGN PATENT DOCUMENTS

| | | | | |
|---|---|---|---|---|
| DE | 20307198 U1 | * | 9/2003 | ............. H02K 7/003 |
| DE | 20307198 U1 | | 9/2003 | |
| JP | 2000060041 A | * | 2/2000 | |

(Continued)

OTHER PUBLICATIONS

English Translation JP2000060041 (Year: 2000).*

(Continued)

*Primary Examiner* — Jose A Gonzalez Quinones
(74) *Attorney, Agent, or Firm* — Lorenz & Kopf LLP

(57) ABSTRACT

A rotor assembly for a permanent magnet electric motor defines an axis of rotation and includes a jacket member and a magnet member. The magnet member is received within the jacket member. The magnet member defines a central aperture with a first end and a second end. The axis of rotation extends through the first end and the second end. The rotor assembly further includes a shaft arrangement with a first shaft structure and a second shaft structure. The first shaft structure is received in the first end of the magnet member, and the second shaft structure is received in the second end of the magnet member. The first shaft structure and the second shaft structure are attached within the magnet member at an internal coupling. The shaft arrangement and the jacket member cooperate to compress the magnet member radially with respect to the axis of rotation.

19 Claims, 6 Drawing Sheets

(56) References Cited

FOREIGN PATENT DOCUMENTS

JP        2000060041 A        2/2000

OTHER PUBLICATIONS

English Translation DE20307198 (Year: 2003).*
Toma, Optimization of rotor shaft shrink fit method for motor using "Robust design", Journal of Industrial Engineering International, Jan. 10, 2018, 14:705-717, National Institute of Technology, Tsuruoka College, Tsuruoka, Japan.

* cited by examiner

ROTOR ASSEMBLY FOR PERMANENT MAGNET ELECTRIC MOTOR WITH PLURALITY OF SHAFT STRUCTURES

TECHNICAL FIELD

The present disclosure generally relates to a motor and, more particularly, to a rotor assembly for a permanent magnet electric motor with a plurality of shaft structures.

BACKGROUND

Permanent magnet electric motors can be used in a variety of applications. These motors provide high efficiency operation as well as other advantages.

However, many permanent magnet electric motors have deficiencies. Manufacturing methods may be highly complex, labor-intensive, and/or have other inefficiencies. For example, parts are typically held to relatively high tolerances, which increases manufacturing complexity and cost. Also, some manufacturing methods, such as thermal shrink-fitting, may be complex and inefficient.

Thus, it is desirable to provide a high-quality permanent magnet electric motor that can be manufactured in a highly efficient manner. Other desirable features and characteristics of the present disclosure will become apparent from the subsequent detailed description and the appended claims, taken in conjunction with the accompanying drawings and this background discussion.

BRIEF SUMMARY

In one embodiment, a rotor assembly for a permanent magnet electric motor is disclosed. The rotor assembly defines an axis of rotation and includes a jacket member and a magnet member. The magnet member is received within the jacket member. The magnet member defines a central aperture with a first end and a second end. The axis of rotation extends through the first end and the second end. The rotor assembly further includes a shaft arrangement with a first shaft structure and a second shaft structure. The first shaft structure is received in the first end of the magnet member, and the second shaft structure is received in the second end of the magnet member. The first shaft structure and the second shaft structure are attached within the magnet member at an internal coupling. The shaft arrangement and the jacket member cooperate to compress the magnet member radially with respect to the axis of rotation.

In another embodiment, a method of manufacturing a rotor assembly for a permanent magnet electric motor is disclosed. The method includes providing a first shaft structure and a second shaft structure of a shaft arrangement. The method also includes providing a magnet member that is received within a jacket member. The magnet member includes a central aperture with a first end and a second end. The method further includes moving the first shaft structure into the first end, moving the second shaft structure into the second end, and attaching the first shaft structure and the second shaft structure at an internal coupling within the magnet member to compress the magnet member radially with respect to the axis of rotation between the shaft arrangement and the jacket member.

In an additional embodiment, a permanent magnet electric motor is disclosed. The motor includes a stator and a rotor assembly supported for rotation within the stator about an axis of rotation. The rotor assembly includes a jacket member that is hollow and cylindrical. The rotor assembly further includes a cylindrical magnet member that includes a first arcuate magnet segment, a second arcuate magnet segment, a first inter-magnet plate, a second inter-magnet plate, a first axial end plate, and a second axial end plate. The first and second inter-magnet plates are disposed between the first and second arcuate magnet segments. Also, the first and second inter-magnet plates are spaced apart in a circumferential direction with respect to the axis. Furthermore, the first and second axial end plates are disposed on opposite axial ends of the magnet member. The magnet member defines a central aperture with the first axial end plate defining an open first axial end of the magnet member and the second axial end plate defining an open second axial end of the magnet member. Additionally, the rotor assembly includes a shaft arrangement with a first shaft structure and a second shaft structure. The first shaft structure includes a radial projection, and the second shaft structure has a radial recess. The first shaft structure is partly received in the open first end of the magnet member, and the second shaft structure is partly received in the open second end of the magnet member. The radial projection of the first shaft structure is received in the radial recess of the second shaft structure to attach the first shaft structure to the second shaft structure within the central aperture. The first and second shaft structures and the jacket member cooperate to compress the magnet member radially with respect to the axis of rotation.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
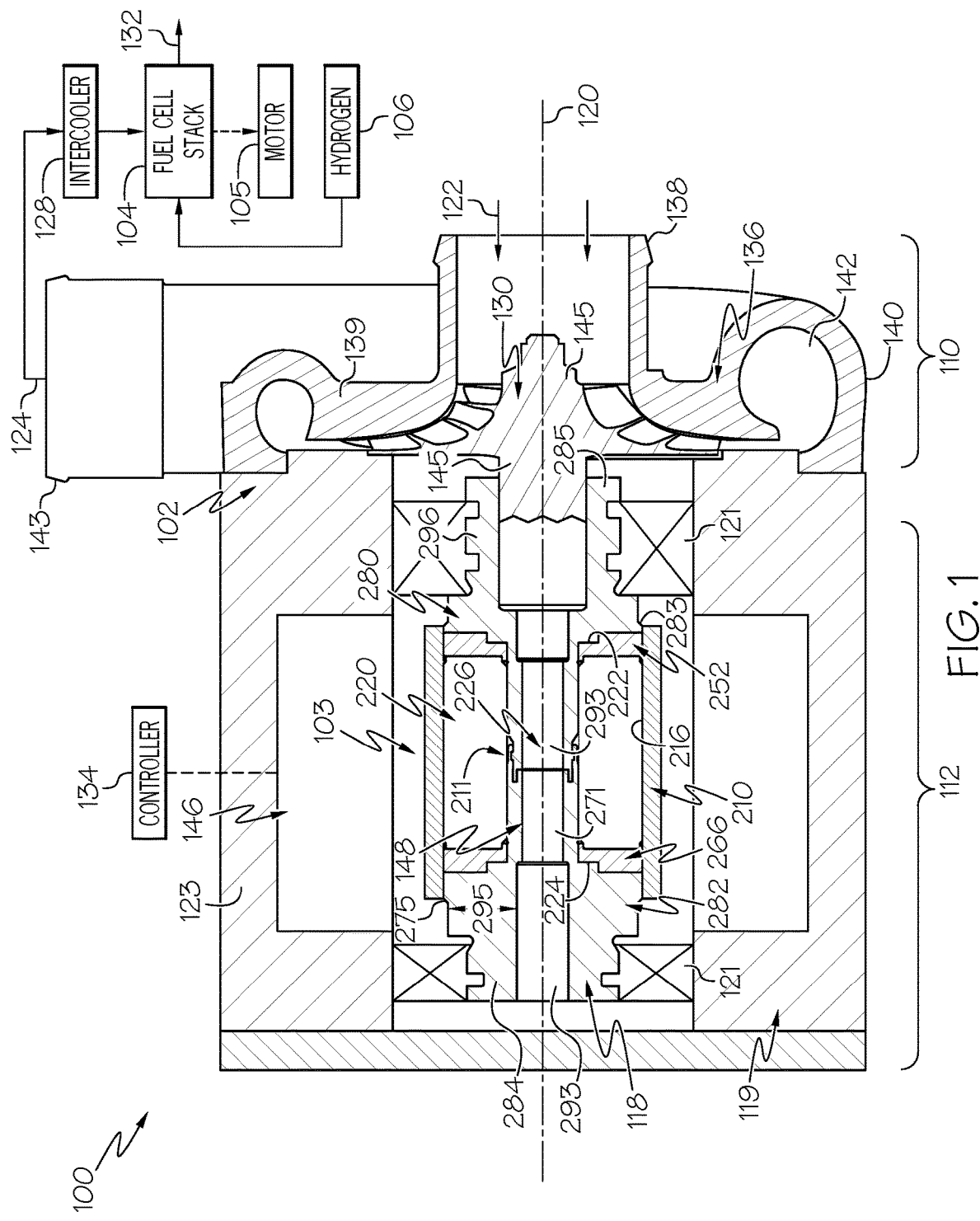
FIG. 1 is a schematic view of a fuel cell system with a permanent magnet electric motor according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a well-built, high efficiency permanent magnet electric motor with a rotor assembly that has improved manufacturability. The rotor assembly may include a magnet member that is retained together with a jacket member using a shaft arrangement that includes a plurality of shaft structures. In some embodiments, the shaft structures load the magnet member toward the jacket member in a radially outward direction. As such, in some embodiments, components of the magnet member are compressed (outward and inward) in the radial direction between the shaft arrangement and the jacket member.

In some embodiments, the shaft arrangement may include a first shaft structure (i.e., a first stub shaft, a first half-shaft structure, etc.) and a second shaft structure (i.e., a second stub shaft, a second half-shaft structure, etc.). The first and second shaft structures may be fixedly attached and interlocked within the magnet member. The first and second shaft structures may be attached, for example, at respective ends within the magnet member. The shaft structures may also be interference and/or frictionally fit within the magnet member to provide the radially directed load to the magnet member. More specifically, the diameter of the shaft arrangement may be slightly greater than a diameter of a bore defined by the magnet member to provide the interference/frictional fit therebetween. Additionally, the shaft arrangement may compress, align, and/or retain the magnet member in the axial direction. For example, the shaft structures may be fixedly attached to the jacket member, thereby retaining the magnet member within the jacket member. In some embodiments, the shaft structures and the jacket member may encapsulate the magnet member within the axial ends and within the inner diameter of the jacket member.

The shaft structures may be fixedly attached together at a coupling, which may be of a variety of types without departing from the scope of the present disclosure. For example, in some embodiments, the coupling may be a male-female coupling in which the second shaft structure receives a portion of the first shaft structure. More specifically, in some embodiments, the first shaft structure may include at least one projection, and the second shaft structure may include at least one recess that receives the projection of the first shaft structure.

Also, the magnet member may include two or more segments. At least one of the shaft structures may load the segments of the magnet member outward radially to retain the magnet segments and the jacket member together. The magnet member may include additional components for interconnecting and retaining the components of the rotor assembly. For example, the rotor assembly may include one or more inter-magnet members and axial end members that engage each other and/or engage the magnet segments to securely retain the components.

Accordingly, as will be discussed, the rotor assembly of the present disclosure provides a number of benefits. The shaft arrangement and magnet member are configured such that the rotor assembly may be manufactured efficiently, accurately, and in a repeatable fashion. Also, the rotor assembly ensures that the permanent magnet electric motor has high efficiency operation, durability, and other advantages.

Referring now to FIG. 1, a fuel cell system 100 with an example charging device 102 is shown. The charging device 102 includes an electric motor 103 with a rotor assembly 148 that is configured according to example embodiments of the present disclosure. It will be appreciated that the electric motor 103 and the rotor assembly 148 therein may be included in a different system (other than a fuel cell system) without departing from the scope of the present disclosure.

The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electric motor 105 as well as other connected electrical devices. The fuel cell system 100 may be included in a vehicle, such as a car, truck, sport utility vehicle, van, motorcycle, etc. Accordingly, in some embodiments, the electric motor 105 may convert the electrical power generated by the fuel cell stack 104 to mechanical power to drive and rotate an axle (and, thus, one or more wheels) of the vehicle. However, it will be appreciated that the fuel cell system 100 may be configured for a different use without departing from the scope of the present disclosure.

Oxygen may be provided to the fuel cell stack 104, at least in part, by the charging device 102. The charging device 102 may be configured as an electric compressor device (i.e., electric supercharger) with a single-stage compressor in some embodiments.

As shown in FIG. 1, the charging device 102 may generally include a rotating group 118 and a housing 119. The rotating group 118 may be supported for rotation within the housing 119 about an axis of rotation 120 by one or more bearings 121. The bearing(s) 121 may have various configurations, such as a plain bearing, an air bearing, an oil-less bearing, a rolling element bearing, etc.

The charging device 102 may define a motor section 112. The motor section 112 may include the electric motor 103 mentioned above. In addition to the rotor assembly 148, the motor 103 may also include a stator 146, which receives the rotor assembly 148. The stator 146 may include a plurality of windings that conduct electricity. Furthermore, the motor section 112 may include part of the housing 119. Specifically, the motor section 112 may include a motor housing 123, which supports the stator 146 and houses both the stator 146 and the rotor assembly 148. The rotor assembly 148 may include a magnet member 220, which will be discussed in detail below. The fuel cell stack 104 may provide electricity for the stator 146 to drivingly rotate the magnet member 220 of the rotor assembly 148 and other components of the rotating group 118.

The charging device 102 may also include a compressor section 110. In some embodiments, the compressor section 110 may be the sole (only) compressor section of the charging device 102. In other embodiments, there may be a plurality of compressor sections to define a multi-stage charging device 102. The compressor section 110 may include a compressor wheel 130, which is fixed to the rotor assembly 148 to be part of the rotating group 118. Although partially shown in FIG. 1, the compressor wheel 130 may include a hub portion 145 that is fixed to the rotor assembly 148 of the motor section 112 via one or more fasteners, weldments, and/or other attachment. The compressor section 110 may also define part of the housing 119. Specifically, the compressor section 110 may include a compressor housing member 136, which is fixed to an axial end of the motor housing 123, and which defines an axial inlet 138, a shroud member 139, and a volute member 140. The axial inlet 138, shroud member 139, and volute member 140 may be attached together in a unitary, one-piece compressor housing member 136. The axial inlet 138 may be tubular, straight, and centered on the axis 120. The shroud member 139 may be inversely shaped according to components of the compressor wheel 130. The volute member 140 may define a volute passage 142 therein that extends about the axis 120. The volute member 140 may also define an outlet 143.

Accordingly, the motor 103 may drivingly rotate the compressor wheel 130 about the axis 120. An inlet airstream (represented by arrows 122) may flow into the inlet 138, flow through the shroud member 139, and flow into the volute passage 142. A resultant compressed airstream (represented by arrow 124) may be directed to an intercooler 128 and then to the fuel cell stack 104 for boosting the operating efficiency of the fuel cell system 100.

Furthermore, an exhaust gas stream (represented by arrow 132) from the fuel cell stack 104 may be exhausted to atmosphere as represented in FIG. 1. Stated differently, the exhaust gas stream 132 may be directed away from the charging device 102. In other embodiments, the exhaust gas stream 132 may be directed back toward the charging device 102, for example, to drive rotation of a turbine wheel that is included in the rotating group 118. This may, in turn, drive rotation of the compressor wheel 130, for example, to assist the electric motor 103.

Various components of the fuel cell system 100 may be controlled by a control system 134. The control system 134 may be a computerized system with a processor, various sensors, and other components for electrically controlling operation of the motor 103, the fuel cell stack 104, and/or other features of the system 100. In some embodiments, the control system 134 may receive sensor input (e.g., indicating speed of the motor 105, etc.) and control the speed of the motor 103 according to that input. The control system 134 may define or may be part of the electrical control unit (ECU) of a vehicle.

Figure 2:
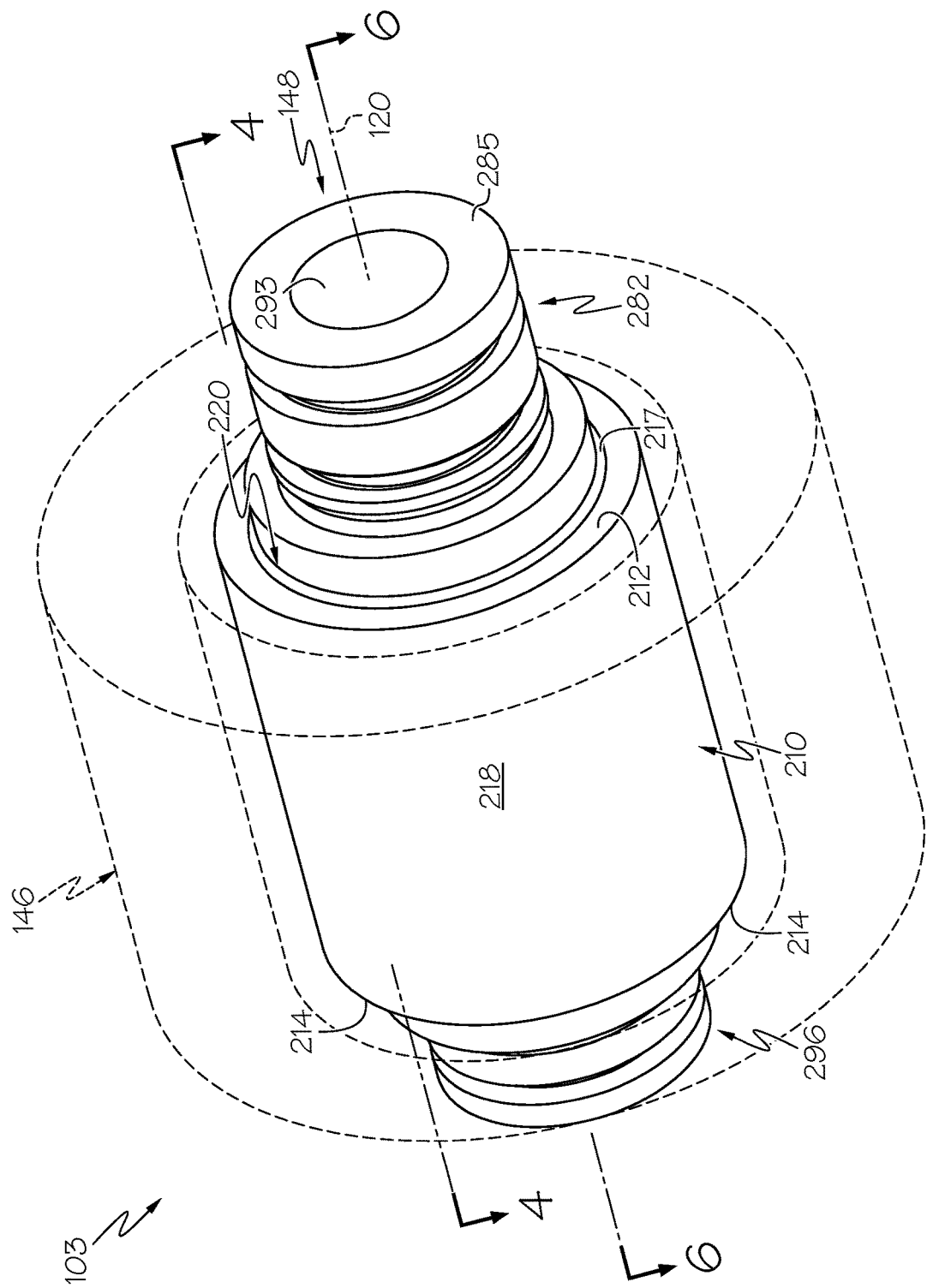
FIG. 2 is a perspective view of a rotor assembly of the permanent magnet electric motor of FIG. 1, wherein the rotor assembly is shown in an assembled state.
Figure 3:
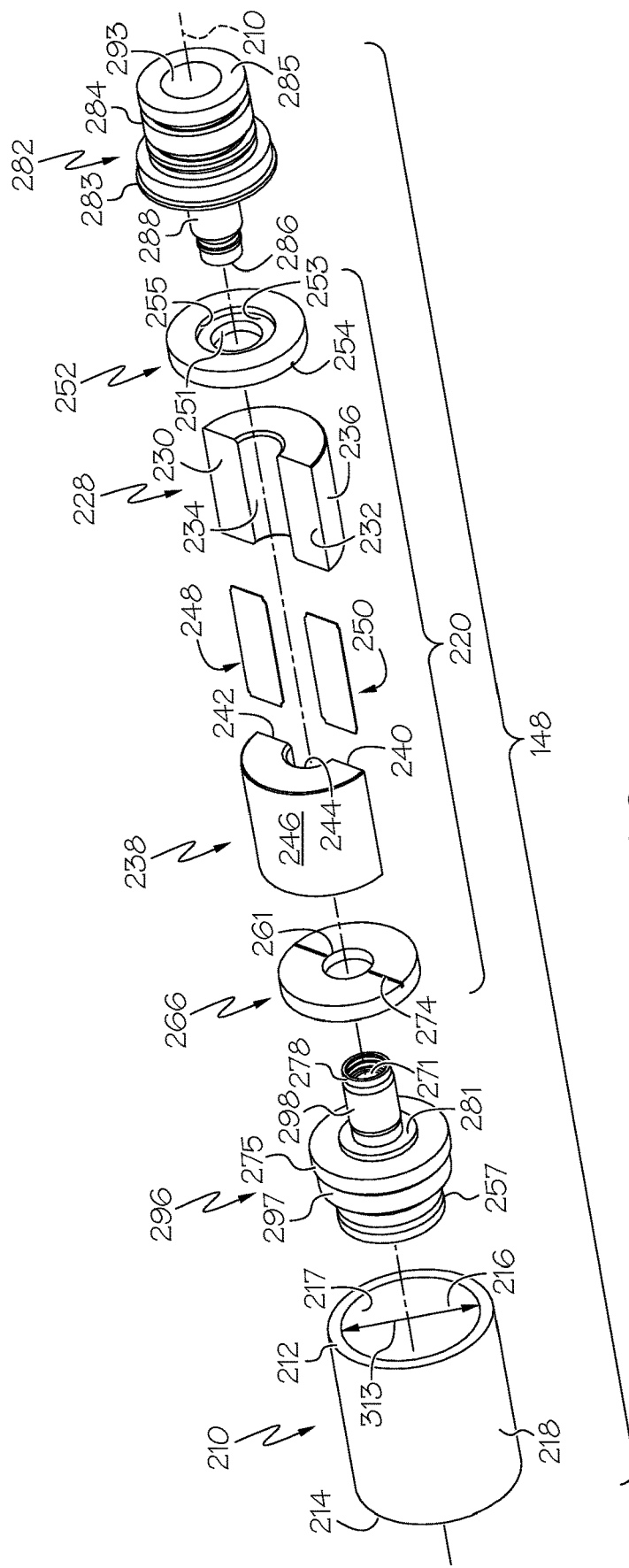
FIG. 3 is an exploded perspective view of the rotor assembly of FIG. 2.

Referring now to FIGS. 2 and 3, the rotor assembly 148 of the motor 103 will be discussed in greater detail according to example embodiments of the present disclosure. The stator 146 is shown schematically and in phantom to reveal the rotor assembly 148.

Figure 4:
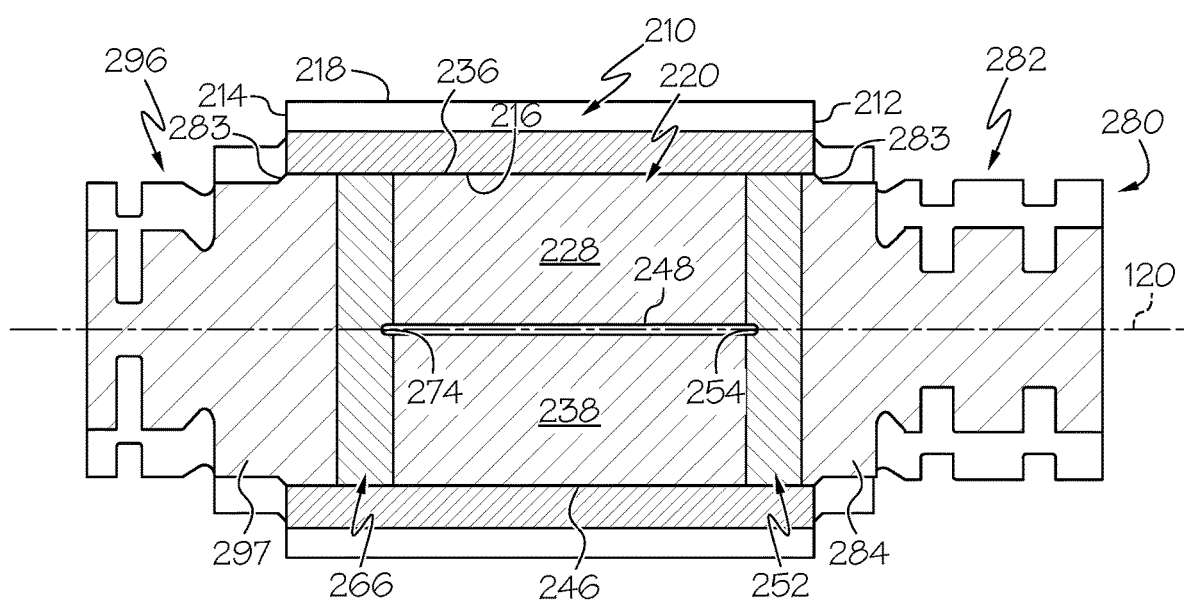
FIG. 4 is a section view of the rotor assembly taken along the line 4-4 of FIG. 2.

As shown, the rotor assembly 148 may include a jacket member 210. The jacket member 210 may be a unitary, hollow tube. In some embodiments, the jacket member 210 may be centered about the axis 120. The jacket member 210 may include a first end 212 and a second end 214 that are spaced apart along the axis 120. As shown in FIGS. 3 and 4, the jacket member 210 may also include an inner surface 216 (inner diameter surface) that faces and encircles the axis 120. As shown in FIGS. 2-4, the jacket member 210 may also include an outer surface 218 (outer diameter surface) that faces outward radially from the axis 120. The inner and/or outer surfaces 216, 218 may be smooth and continuous in some embodiments. Also, in some embodiments, the diameters of the inner surface 216 and the outer surface 218 may be substantially constant along the length of the jacket member 210. Furthermore, the inner surface 216 may define a central bore 217 extending axially through the jacket member 210.

Figure 6:
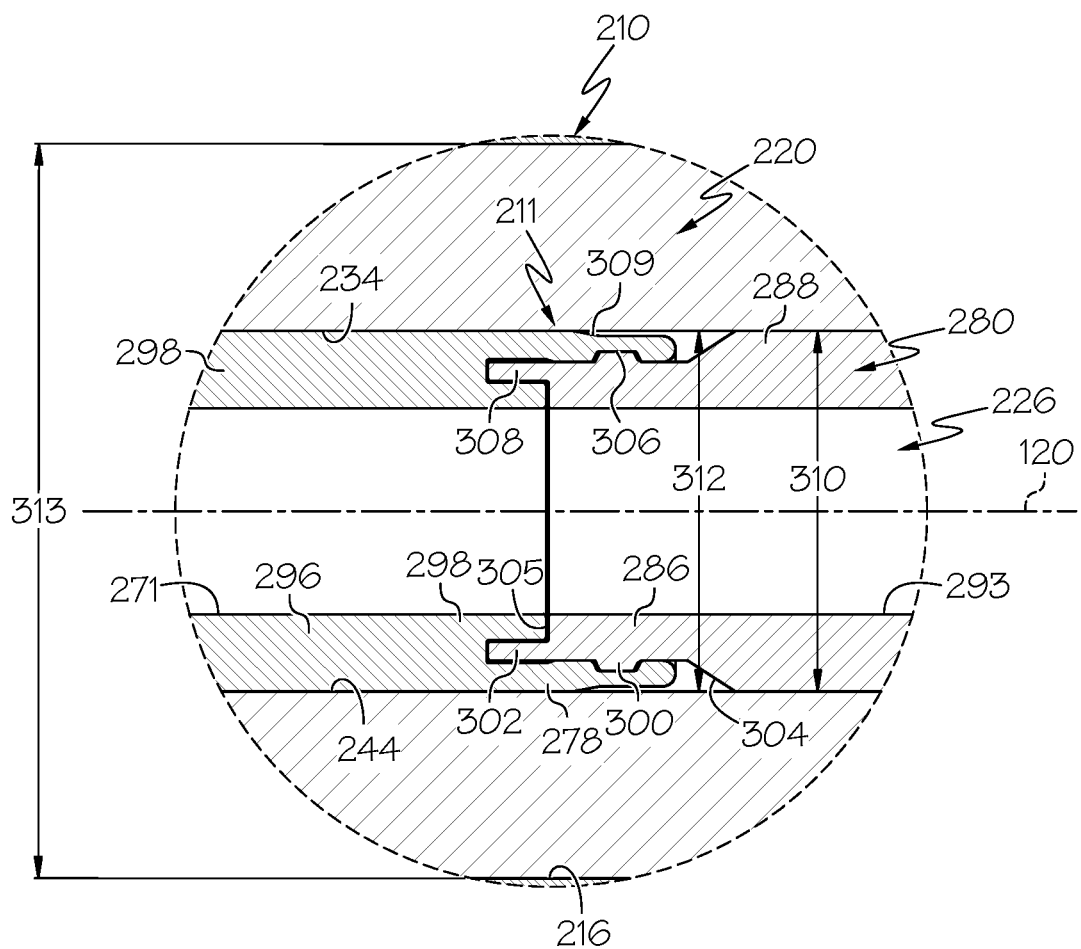
FIG. 6 is a section view of the rotor assembly taken along the line 6-6 of FIG. 2.

The rotor assembly 148 may further include the magnet member 220. The magnet member 220 may be substantially cylindrical and hollow so as to define a central aperture 226 (FIGS. 1 and 6). The central aperture 226 may be centered on and may extend through the magnet member 220 along the axis 120 from an open first end 222 to an open second end 224 (FIG. 1).

The magnet member 220 may include a plurality of segments that are constructed from and/or that include a permanent magnet. In some embodiments, for example, the magnet member 220 includes a first arcuate magnet segment 228 and a second arcuate magnet segment 238. The first and second magnet segments 228, 238 may be arranged about the axis 120 at different angular positions. The first arcuate magnet segment 228 may be referred to as a north pole magnet, and the second arcuate magnet segment 238 may be referred to as a south pole magnet. Although only two magnet segments are shown, it will be appreciated that the magnet member 220 may include more than two segments arranged about the axis 120 without departing from the scope of the present disclosure.

As shown in FIG. 3, the first arcuate magnet segment 228 may be arcuate (e.g., with a semi-circular cross section) and may extend in a circumferential direction about the axis 120 between a first circumferential edge 230 and an opposite second circumferential edge 232. The first arcuate magnet segment 228 may also extend along the axis 120. The first arcuate magnet segment 228 may further include an inner face 234 that faces and arcuately contours about the axis 120. Moreover, an outer face 236 may face radially outward from the axis 120 and may arcuately contour about the axis 120.

The second arcuate magnet segment 238 may be substantially similar to the first arcuate magnet segment 228. Accordingly, the second arcuate magnet segment 238 may be arcuate (e.g., semi-circular) and may extend in a circumferential direction about the axis 120 between a first circumferential edge 240 and a second circumferential edge 242. The second arcuate magnet segment 238 may further include an inner face 244 that faces and arcuately contours about the axis 120. Moreover, an outer face 246 may face radially outward from the axis 120 and may arcuately contour about the axis 120.

Furthermore, the magnet member 220 may include a first inter-magnet plate 248 and a second inter-magnet plate 250. The first and/or second inter-magnet plates 248, 250 may be a flat, rectangular sheet of ferro-magnetic material, such as magnetic steel. The plates 248, 250 may have a constant sheet thickness in some embodiments. The first inter-magnet plate 248 may be disposed in a circumferential direction between the first circumferential edge 230 of the first arcuate magnet segment 228 and the second circumferential edge 242 of the second arcuate magnet segment 238. Similarly, the second inter-magnet plate 250 may be disposed in a circumferential direction between the first circumferential edge 240 of the second arcuate magnet segment 238 and the second circumferential edge 232 of the first arcuate magnet segment 228.

The magnet member 220 may further include a first axial end plate 252. The first axial end plate 252 may be an annular disc made from a strong and rigid material. The first axial end plate 252 may include a central opening 251 that is centered on the axis 120. The first axial end plate 252 may also include an annular recess 253 on an outer axial face thereof. The annular recess 253 may include an inner diameter surface 255 that faces the axis 120. The inner diameter surface 255 may define at least part of the central opening 251 in some embodiments.

Moreover, the magnet member 220 may include a second axial end plate 266. The second axial end plate 266 may be substantially similar to the first axial end plate 252. Accordingly, the second axial end plate 266 may be an annular disc made from a strong and rigid material. The second axial end plate 266 may include a central opening 261 that is centered on the axis 120. Although not shown, the second axial end plate 266 may also include an annular recess (similar to the recess 253) on an outer axial face thereof.

Additionally, as shown in FIGS. 3 and 4, the inner axial face of the second axial end plate 266 may include a slot 274. The slot 274 may be straight and may extend radially (FIG. 3). The longitudinal axis of the slot 274 may intersect the axis 120, and the central opening 261 may bisect the slot 274 in some embodiments. The slot 274 may be open at the outer diameter edge of the second axial end plate 266 and/or at the central opening 261. As shown in FIGS. 3 and 4, the first axial end plate 252 may similarly include a slot 254 on the inner axial face thereof.

Thus, in some embodiments, the magnet member 220 may be collectively defined by the first and second arcuate magnet segments 228, 238, the first and second inter-magnet plates 248, 250, and the first and second axial end plates 252, 266. Thus, the arcuate magnet segments 228, 238, the inter-magnet plates 248, 250, and the end plates 252, 266 may be arranged about the axis 120 and may collectively define its cylindrical shape and profile. These parts may collectively define the central aperture 226 of the magnet member 220. The central opening 251 of the first axial end plate 252 may define the open first end 222 of the central aperture 226 of the magnet member 220. The central opening 261 of the second axial end plate 266 may define the open second end 224 of the magnet member 220. Also, the inner faces 234, 244 of the magnet segments 228, 238 and the inner radial edges of the inter-magnet plates 248, 250 may define a majority of the inner diameter surface of the central aperture 226.

As shown in FIG. 4, the first axial end plate 252 may be engaged with the first inter-magnet plate 248. For example, as shown, the axial edge of the first inter-magnet plate 248 may be received within the slot 254 of the first axial end plate 252. The opposite axial edge of the first inter-magnet plate 248 may be similarly received in the slot 274 of the second axial end plate 266 to engage therewith. Likewise, the second inter-magnet plate 250 may be received within the slots 254, 274 to engage with the first and second axial end plates 252, 266. Accordingly, the axial end plates 252, 266 may be fixedly attached to the inter-magnet plates 248, 250 and retained against relative rotation about the axis 120. Also, as shown in FIG. 4, the inner axial face of the first and second axial end plates 252, 266 may be disposed closely adjacent the axial ends of the first and second arcuate magnet segments 228, 238. These opposing faces may be in abutting contact in some embodiments. Thus, the magnet segments 228, 238, the end plates 252, 266, and the inter-magnet plates 248, 250 may be retained together for rotation as a unit about the axis 120. Also, the inter-magnet plates 248, 250 may limit (prevent) shifting of the magnet segments 228, 238 in the circumferential direction about the axis 120.

The magnet member 220 may be received within the jacket member 210. As will be discussed, in some embodiments, the outer face 236 of the first arcuate magnet segment 228 may abut against the inner surface 216 of the jacket member 210. Likewise, the outer face 246 of the second arcuate magnet segment 238 may abut against the inner surface 216. Also, in some embodiments, the outer edges of the first and second inter-magnet plates 248, 250 may abut against the inner surface 216. Furthermore, the outer diameter surfaces of the first and second axial end plates 252, 266 may be proximate (e.g., may abut against) the inner surface 216.

The rotor assembly 148 may further include a shaft arrangement 280. The shaft arrangement 280 may have a variety of configurations without departing from the scope of the present disclosure. In general, at least part of the shaft arrangement 280 may be received in the central aperture 226 of the magnet member 220 and may be engaged with the magnet member 220. The shaft arrangement 280 may also be fixedly attached to the jacket member 210.

Also, the shaft arrangement 280 may provide an outwardly directed load to the magnet member 220 and may cooperate with the jacket member 210 to compress the components of the magnet member 220 in the radial direction with respect to the axis 120. Thus, the shaft arrangement 280 may retain the magnet member 220 and the jacket member 210 together. Furthermore, the shaft arrangement 280 may support other features of the rotating group 118 as well. For example, the compressor wheel 130 may be fixed on and supported by the shaft arrangement 280 for rotation about the axis 120. Also, in some embodiments, the shaft arrangement 280 may be supported by the bearing(s) 121 for rotation about the axis 120 relative to the stator 146 and the housing 119.

Figure 5:
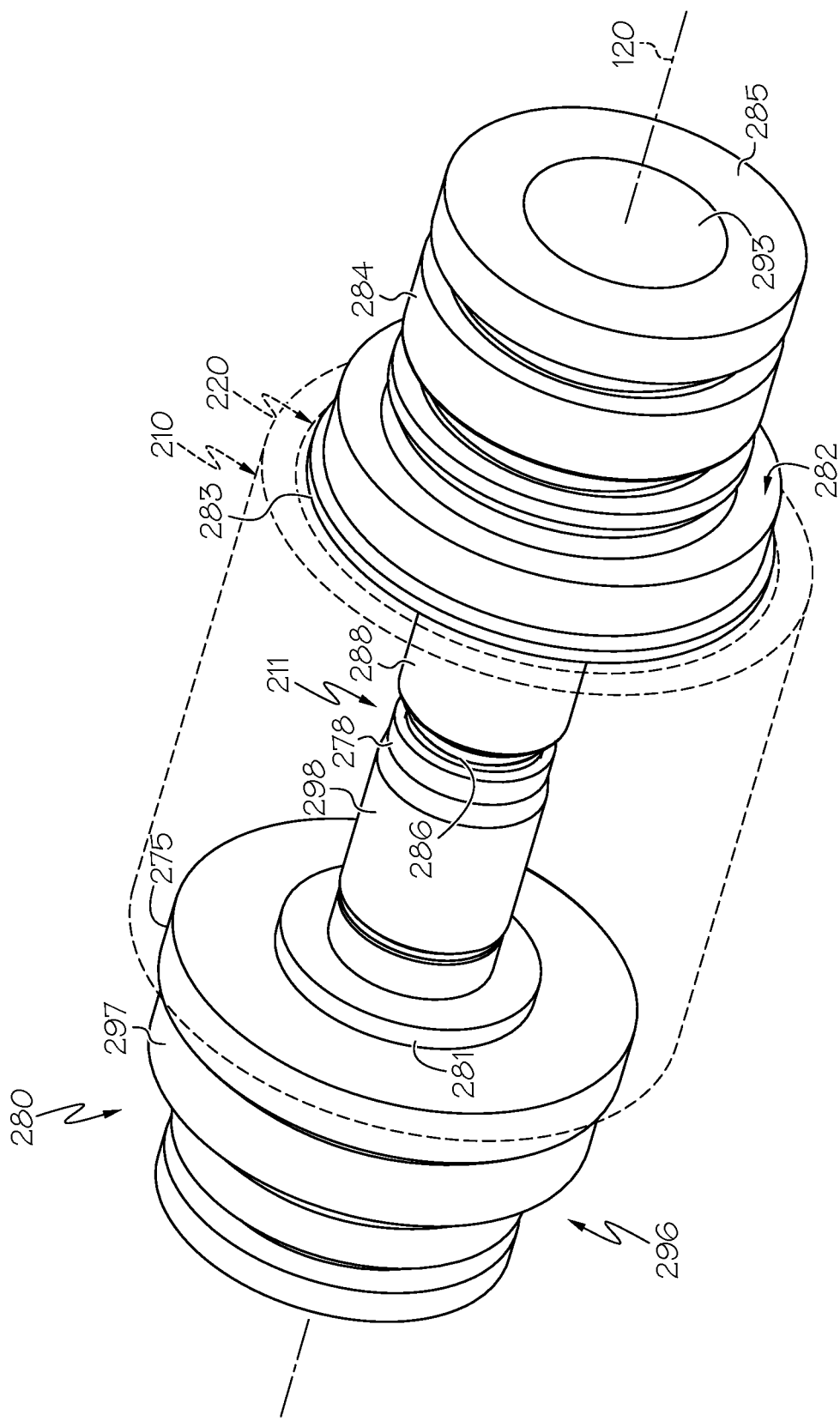
FIG. 5 is a perspective view of shaft structures of the rotor assembly of FIG. 2.

The shaft arrangement 280 is shown in isolation in FIG. 5 with the magnet member 220 and the jacket member 210 shown schematically in phantom. In some embodiments, the shaft arrangement 280 may include a first shaft structure 282 and a second shaft structure 296. The first shaft structure 282 may be referred to as a first stub shaft in that the first shaft structure 282 extends partly along the axis 120 of the rotor assembly 148, and the second shaft structure 296 may be referred to as a second stub shaft in that the second shaft structure 296 extends partly along the axis 120 of the rotor assembly 148. The first shaft structure 282 may be disposed proximate one axial end of the rotor assembly 148, and the second shaft structure 296 may be disposed proximate the opposite axial end. The first shaft structure 282 may be substantially similar to the second shaft structure 296 except as noted herein. Also, ends (stub ends) of the first and second shaft structures 282, 296 may be fixedly attached and engaged at an internal coupling 211. At least one of (e.g., each of) the first and second shaft structures 282, 296 may engage, abut against, and/or provide a load to the magnet member 220, pushing the components of the magnet member 220 outward radially against the inner surface 216 of the jacket member 210 for retaining the same in a fixed position within the rotor assembly 148.

As shown in FIGS. 3 and 5, the first shaft structure 282 may be a unitary, one-piece member that is made from strong and substantially rigid metallic material. The first shaft structure 282 may include a base 284 and a stub 288 that projects axially from the base 284. Also, a bore 293 may extend through the first shaft structure 282. The bore 293 may be centered on the axis 120 and may pass through the base 284 and the stub 288 from one axial end of the first shaft structure 282 to the other. Thus, the first shaft structure 282 may have an annular and hollow cross section taken perpendicular to the axis 120.

As shown in FIG. 1, the diameter of the bore 293 at an outer axial end 285 of the shaft structure 282 may be greater than the diameter of the bore 293 at a first inner axial end 286 (first stub end) thereof. The outer axial end 285 of the shaft structure 282 may support the compressor wheel 130, fasteners, and/or other components of the rotating group 118 as schematically represented in FIG. 1.

The outer diameter of the first shaft structure 282 may vary along its axial length. For example, the base 284 may generally have a larger diameter than the stub 288. The base 284 may include one or more circumferential grooves, disc-like projections, etc. on the outer diameter surface thereof. The base 284 may vary in diameter along its axial length with an intermediate, disc-shaped flange 283 having the greatest diameter of the first shaft structure 282. The stub 288 may project axially away from one side of the flange 283, and the outer axial end 285 may project axially away from the other side of the flange 283.

Likewise, the second shaft structure 296 may be a unitary, one-piece member that is made from strong and rigid metallic material. The second shaft structure 296 may include a base 297 and a stub 298 that projects axially from the base 297. Also, a bore 271 (FIGS. 3 and 6) may extend through the second shaft structure 296. The bore 271 may comprise an opening that is centered on the axis 120 and that passes continuously through the base 297 and the stub 298 from one axial end of the second shaft structure 296 to the other. Thus, the second shaft structure 296 may have an annular and hollow cross section taken perpendicular to the axis 120.

The base 297 may generally have a larger diameter than the stub 298. The base 297 may vary in diameter along its axial length with an intermediate, disc-shaped flange 275 having the greatest diameter of the second shaft structure 296. The stub 298 may project axially away from one side of the flange 275 and a grooved outer axial end 257 may project axially away from the other side of the flange 275. The stub 298 may terminate at a second inner axial end 278 (second stub end) of the second shaft structure 296. Also, the stub 298 may include a shoulder 281 proximate the flange 275, and the shoulder 281 may define an outer diameter surface that faces outward radially. Although hidden in FIG. 3, the stub 288 of the first shaft structure 282 may include a shoulder 281 as well.

The first inner axial end 286 and the second inner axial end 278 may be configured to attach together at the internal coupling 211 (FIGS. 5 and 6). The first and second inner axial ends 286, 278 may cooperatively define the internal coupling 211. For example, in some embodiments, the coupling may be a male-female coupling, wherein one of the ends 286, 278 receives the other for attachment. Also, the coupling 211 may comprise a so-called "gib key" attachment, wherein the ends 286, 278 include corresponding tapered surfaces that interact with each other, and/or wherein a notch of one of the ends 286, 278 receives a projection from the other for attaching the shaft structures 282, 296.

More specifically, in some embodiments represented in FIG. 6, the first inner axial end 286 of the shaft structure 282 may include a taper 304 at which the outer diameter of the stub 288 gradually reduces as the stub 288 extends axially toward its terminal end. Also, the first inner axial end 286 may include a radial projection 300. The radial projection 300 may project radially outward from the axis 120. In some embodiments, the radial projection 300 may extend annularly and continuously about the axis 120. Also, as shown in FIG. 6, the radial projection 300 may have an axial cross-sectional profile having tapered surfaces on both sides of a plateaued surface. Stated differently, the radius of the radial projection 300 varies such that, moving along the axis 120 away from the taper 304, the radius at the radial projection 300 increases gradually, then remains constant, and then gradually reduces. This profile may remain consistent about the axis 120 such that the tapered and plateaued surfaces of the radial projection 300 extend annularly, continuously, and uninterrupted about the axis 120 in the circumferential direction. Additionally, the inner axial end 286 may include an axial projection 302. The axial projection 302 may be a relatively thin-walled cylinder with a substantially constant radius on its inner and outer diameter surfaces and that projects axially to define the terminus of the inner axial end 286. Also, the bore 293 may be stepped proximate the axial projection 302 to define an inner shoulder 305 as shown in FIG. 6.

Furthermore, the second inner axial end 278 may include a taper 309 at which the outer diameter of the stub 298 reduces slightly. The second inner axial end 278 may also include a radial aperture 306. The radial aperture 306 may correspond in shape, dimension, etc. to that of the radial projection 300. Thus, the radial aperture 306 may be a notch that is recessed radially outward with respect to the axis 120, and the profile of the radial aperture 306 may include tapered surfaces on both sides of a plateaued surface such that the radial aperture 306 is substantially inverse to the radial projection 300. Also, the radial aperture 306 may extend continuously and annularly about the axis 120. Furthermore, the inner axial end 278 may include an axial recess 308. The axial recess 308 may correspond in shape, dimension, etc. to that of the axial projection 302. Accordingly, the axial recess 308 may be a cylindrical recess disposed between the inner and outer diameter surfaces of the second inner axial end 278.

As shown in FIG. 6, the first inner axial end 286 may be attached to the second inner axial end 278 at the internal coupling 211 of the shaft arrangement 280. Specifically, the radial aperture 306 may receive the radial projection 300. Also, the axial recess 308 may receive the axial projection 302 with the second inner axial end 278 abutting the shoulder 305 of the first inner axial end 286. The opposing surfaces of the first and second inner axial ends 286, 278 may abut and frictionally engage each other such that the first and second shaft structures 282, 296 are fixedly engaged together.

Additionally, as shown in FIGS. 1 and 6, the first shaft structure 282 and the second shaft structure 296 may be fixedly attached to the magnet member 220. The stub 288 of the first shaft structure 282 may be received within the first end 222 of the central aperture 226 of the magnet member 220, the stub 298 of the second shaft structure 296 may be received within the second end 224 of the central aperture 226 of the magnet member 220, and the first axial end 286 may be fixedly attached to the second axial end 278 at the internal coupling 211 as described above. The outer diameter surface of at least one (e.g., both) of the stubs 288, 298 may abut and frictionally engage the inner diameter surface of the magnet member 220. More specifically, in some embodiments represented in FIG. 6, the stubs 288, 298 may define an outer diameter dimension 310 (i.e., outer width dimension), and the inner faces 234, 244 of the magnet segments 228, 238 may define an inner diameter dimension 312 (i.e., inner width dimension). The outer diameter dimension 310 may be slightly greater than the inner diameter dimension 312; therefore, the shaft arrangement 280 may be interference fit to the magnet member 220 within the jacket member 210. (It will be appreciated that the jacket member 210 defines a fixed inner diameter dimension 313, which is configured such that the jacket member 210 counters the radial load from the shaft arrangement 280. Accordingly, the magnet segments 228, 238 are compressed radially and fixed between the shaft arrangement 280 and the jacket member 210.) The radial compressive load on the magnet member 220 may be distributed substantially evenly about the axis 120. Also, the shaft arrangement 280 may load the first arcuate magnet segment 228 generally in one radial direction away from the axis 120, and the shaft arrangement 280 may load the second arcuate magnet segment 238 generally in an opposite radial direction away from the axis 120. Thus, shaft arrangement 280 may cooperate with the jacket member 210 to compress and retain the magnet member 220.

Additionally, the first shaft structure 282 may be received in the central opening 251 of the first axial end plate 252. The second shaft structure 296 may be similarly received in the central opening 261 of the second axial end plate 266. In this position, the outer diameter surface of the shoulder 281 of the shaft structures 282, 296 may abut the inner diameter surface 255 of the first and second axial end plates 252, 266, respectively. Accordingly, the first shaft structure 282 may be engaged with the first axial end plate 252, and the base 284 may project axially outward from the first end 222 of the magnet member 220. Likewise, the second shaft structure 296 may be engaged with the second axial end plate 266, and the base 257 may project axially outward from the second end 224 of the magnet member 220.

To manufacture the rotor assembly 148, the parts described above may be constructed or otherwise provided using casting techniques, additive manufacturing, or other manufacturing methods. Then, the first arcuate magnet segment 228, the first inter-magnet plate 248, the second arcuate magnet segment 238, and the second inter-magnet plate 250 may be assembled together in the cylindrical configuration described above. Next, in some embodiments, the jacket member 210 may be placed over and may receive the assembled first arcuate magnet segment 228, the first inter-magnet plate 248, the second arcuate magnet segment 238, and the second inter-magnet plate 250.

In some embodiments, there may be sufficient radial clearance (e.g., between the inner surface 216 and the outer faces 236, 246) at or about room temperature (i.e., normal ambient temperature) to allow the jacket member 210 to slide over the magnet segments 228, 238 (i.e., without having to heat the jacket member 210). Accordingly, manufacture may be completed in an efficient manner.

Subsequently, the axial end plates 252, 266 may be positioned on the axial ends of the magnet member 220. In some embodiments, the end plates 252, 266 may be positioned with the inter-magnet plates 248 250 received in the slots 254, 274, respectively. Furthermore, the shaft structures 282, 296 may be positioned over the end plates 252, 266 with the stubs 288, 298 abutting the rims of the central openings 251, 261, respectively.

Subsequently, an axial load may be applied (e.g., using a press) to compress the components of the rotor assembly 148 together toward the axial center. As the load is increased, the stubs 288, 298 may wedge into the central openings 251, 261, and the shaft members 282, 296 may advance inward toward the center of the rotor assembly 148. Eventually, the radial projection 300 may abut against the inner axial end 278 of the second shaft structure 296. Axial compression force may be increased so that second inner axial end 278 resiliently flexes outward radially and/or the first inner axial end 286 resiliently flexes inward radially, allowing the radial projection 300 to move into the radial aperture 306. The second inner axial end 278 and/or the first inner axial end 286 may resiliently recover back toward its neutral position once the radial projection 300 comes to rest within the radial aperture 306. As shown in FIG. 6, the axial projection 302 may also be received in the axial recess 308 once the shaft structures 282, 296 are attached.

Assembly may also cause the shaft structures 282, 296 to mate against, abut, and/or engage the end plates 252, 266, respectively. In some embodiments, the axial movement of the shaft structures 282, 296 toward the center may be limited by the end plates 252, 266 mating against, abutting, and/or engaging the ends of the magnet segments 228, 238, respectively. Also, this axial movement toward the center may be limited by the inter-magnet plates 248, 250 abutting against the interior surfaces of the slots 254, 274. Also, these components may engage together for locating and guiding the axial and radial movement of the shaft structures 282, 296 as the components are compressed together.

Once fully compressed, the shaft structures 282, 296 may be fixedly attached to the jacket member 210. In some embodiments, the flange 283 of the first shaft structure 282 may be welded to one end of the jacket member 210, and the flange 275 of the second shaft structure 296 may be welded to the opposite end of the jacket member 210. For example, spot welding, laser welding, or other types of welding processes may be used to produce one or more weldments that fixedly attach the jacket member 210 to the shaft structures 282, 296. The weldment(s) may be formed at equally spaced locations about the axis 120 or may be formed as a partial or continuous arcuate weldment about the axis 120. Thus, the rotor assembly 148 may be strong and robust, retaining components together in the axial direction.

Moreover, as discussed, the shaft arrangement 280 and the jacket member 210 may radially compress the magnet segments 228, 238 of the magnet member 220 to limit (prevent) relative radial or axial movement between these components. Also, the inter-magnet plates 248, 250 may engage the end plates 252, 266 and limit (prevent) circumferential shifting of the magnet segments 228, 238. Accordingly, the rotor assembly 148 may be strong and robust.

Furthermore, as explained above, assembly of the rotor assembly 148 may be completed efficiently, repeatably, and accurately. The parts may be individually formed within tolerances that are very manageable. The shaft structures 282, 296 allow the components to be assembled together and accurately.

Once assembled, the rotor assembly 148 may be attached to the compressor wheel 130 and/or installed within the stator 146 of the motor 103. Then, the motor 103 may be installed within the fuel cell system 100.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A rotor assembly for a permanent magnet electric motor that defines an axis of rotation comprising:
   a jacket member;
   a magnet member that is received within the jacket member, the magnet member defining a central aperture with a first end and a second end, the axis of rotation extending through the first end and the second end;
   a shaft arrangement with a first shaft structure and a second shaft structure, the first shaft structure received in the first end of the magnet member, the second shaft structure received in the second end of the magnet member, the first shaft structure and the second shaft structure being attached within the magnet member at an internal coupling, the shaft arrangement and the jacket member cooperating to compress the magnet member radially with respect to the axis of rotation;
   wherein the first shaft structure includes a first stub end and the second shaft structure includes a second stub end; and
   wherein the first stub end is received in the second stub end and attached at the internal coupling.

2. The rotor assembly of claim 1, wherein the magnet member includes a first arcuate magnet segment and a second arcuate magnet segment, the first and second arcuate magnetic segments collectively extending about the axis of rotation;
   wherein the shaft arrangement and the jacket member cooperate to compress the first arcuate magnet segment and the second arcuate magnet segment radially with respect to the axis of rotation.

3. The rotor assembly of claim 2, wherein at least one of the first shaft structure and the second shaft structure abuts includes an outer surface that abuts a first inner face of the first arcuate magnet segment and a second inner face of the second arcuate magnet segment;
   wherein the outer surface defines an outer width dimension;
   wherein an inner width dimension is defined between the first inner face and the second inner face; and
   wherein the outer width dimension is greater than the inner width dimension.

4. The rotor assembly of claim 2, further comprising an inter-magnet plate that is disposed in a circumferential direction between the first arcuate magnet segment and the second arcuate magnet segment;
   further comprising an axial end plate that is disposed proximate an axial end of the magnet member; and
   wherein the inter-magnet plate is engaged with the axial end plate.

5. The rotor assembly of claim 1, wherein the first stub end includes a projection that projects radially outward from the axis of rotation; and
   wherein the second stub end includes an aperture that is recessed radially outward and that receives the projection at the internal coupling to attach the first shaft structure and the second shaft structure.

6. The rotor assembly of claim 5, wherein the projection has a tapered surface that tapers in radius with respect to the axis of rotation.

7. The rotor assembly of claim 6, wherein the tapered surface extends about the axis of rotation in a circumferential direction.

8. The rotor assembly of claim 7, wherein the tapered surface extends annularly and continuously about the axis of rotation; and
   wherein the aperture is a notch that extends annularly and continuously about the axis of rotation and that corresponds to the projection.

9. The rotor assembly of claim 5, wherein the projection is a first radial projection and the aperture is a first radial recess;
   wherein the first stub end includes a second projection that projects axially with respect to the axis of rotation; and
   wherein the second stub end includes a second aperture that is recessed axially and that receives the second projection.

10. The rotor assembly of claim 1, wherein the first shaft structure is unitary and the second shaft is unitary; and
    wherein the internal coupling is cooperatively defined by the first shaft structure and the second shaft structure.

11. The rotor assembly of claim 1,
    wherein the first stub end is received within the central aperture of the magnet member; and
    wherein the first shaft structure includes a base that projects outward from the magnet member.

12. A method of manufacturing a rotor assembly for a permanent magnet electric motor having an axis of rotation comprising:
    providing a first shaft structure and a second shaft structure of a shaft arrangement;
    providing a magnet member that is received within a jacket member, the magnet member including a central aperture with a first end and a second end;
    moving a first stub end of the first shaft structure into the first end, moving a second stub end of the second shaft structure into the second end, and attaching the first shaft structure and the second shaft structure by receiving the first stub end in the second stub end at an internal coupling within the magnet member to compress the magnet member radially with respect to the axis of rotation between the shaft arrangement and the jacket member.

13. The method of claim 12, wherein providing the magnet member includes providing a first arcuate magnet segment and a second arcuate magnet segment;
    and further comprising compressing the first arcuate magnet segment and the second arcuate magnet segment radially between the jacket member and at least one of the first and second shaft structures.

14. The method of claim 13, further comprising disposing an inter-magnet plate in a circumferential direction between the first arcuate magnet segment and the second arcuate magnet segment; and
    further comprising disposing an axial end plate proximate an axial end of the first and second arcuate magnet segments and engaging the inter-magnet plate with the axial end plate.

15. The method of claim 14, wherein the inter-magnet plate is a first inter-magnet plate and the axial end plate is a first axial end plate;
    further comprising disposing a second inter-magnet plate in the circumferential direction between the first and second arcuate magnet segments and spaced apart in the circumferential direction from the first inter-magnet plate; and
    further comprising disposing the first and second axial end plates on opposite axial ends of the first and second arcuate magnet segments, engaging the first axial end plate with the first and second inter-magnet plates, and engaging the second axial end plate with the first and second inter-magnet plates;
    further comprising moving the first shaft structure into the first end of the magnet member to engage the first axial end plate, and fixing the first shaft structure to the jacket member; and
    further comprising moving the second shaft structure into the second end of the magnet member to engage the second axial end plate, and fixing the second shaft structure to the jacket member.

16. The method of claim 13, wherein attaching the first shaft structure and the second shaft structure includes moving at least one projection of the first stub end of the first shaft structure into at least one aperture of the second stub end of the second shaft structure.

17. The method of claim 16, wherein the at least one projection is a radial projection that projects radially outward and wherein the at least one aperture is a radial recess that is recessed radially outward; and
    wherein attaching the first shaft structure and the second shaft structure includes moving the radial projection into the radial recess.

18. The method of claim 17, wherein the at least one projection includes the radial projection and an axial projection that projects axially from the first stub end;
wherein the at least one recess includes the radial recess and an axial recess that is recessed axially into the second stub end; and
wherein attaching the first shaft structure and the second shaft structure includes moving the axial projection into the axial recess.

19. A permanent magnet electric motor comprising:
a stator; and
a rotor assembly supported for rotation within the stator about an axis of rotation, the rotor assembly comprising:
a jacket member that is hollow and cylindrical;
a cylindrical magnet member that includes a first arcuate magnet segment, a second arcuate magnet segment, a first inter-magnet plate, a second inter-magnet plate, a first axial end plate, and a second axial end plate, the first and second inter-magnet plates being disposed between the first and second arcuate magnet segments, the first and second inter-magnet plates being spaced apart in a circumferential direction with respect to the axis, the first and second axial end plates disposed on opposite axial ends of the magnet member, the magnet member defining a central aperture with the first axial end plate defining an open first axial end of the magnet member and the second axial end plate defining an open second axial end of the magnet member; and
a shaft arrangement with a first shaft structure and a second shaft structure, the first shaft structure including a radial projection, the second shaft structure having a radial recess, the first shaft structure partly received in the open first end of the magnet member, the second shaft structure partly received in the open second end of the magnet member, the radial projection of the first shaft structure received in the radial recess of the second shaft structure to attach the first shaft structure to the second shaft structure within the central aperture, the first and second shaft structures and the jacket member cooperating to compress the magnet member radially with respect to the axis of rotation.

* * * * *